United States Patent [19]
Mobley et al.

[11] Patent Number: 5,273,076
[45] Date of Patent: Dec. 28, 1993

[54] SOLVENT TRANSPORT DEVICE

[75] Inventors: Mark Mobley; Greg Taylor; Carl Craighead; John Moore; Wayne McGrew, all of San Antonio, Tex.

[73] Assignee: Sony Electronics Inc., Park Ridge, N.J.

[21] Appl. No.: 932,101

[22] Filed: Aug. 19, 1992

[51] Int. Cl.$^5$ .................................. A01G 25/09
[52] U.S. Cl. ............................ 137/899; 137/599
[58] Field of Search ......................... 137/899, 599

[56] References Cited

U.S. PATENT DOCUMENTS

| | | | |
|---|---|---|---|
| 1,843,382 | 2/1932 | Brainich | 137/559 |
| 2,013,370 | 9/1935 | Tygart | 137/899 |
| 2,578,000 | 12/1951 | Cronk | 137/559 |
| 4,513,774 | 4/1985 | Reid | 137/559 |
| 4,628,960 | 12/1986 | Brickell et al. | 137/559 |
| 4,936,349 | 6/1990 | Cowgur | 137/899 |

Primary Examiner—A. Michael Chambers
Attorney, Agent, or Firm—Jerry A. Miller; Robert P. Biddle

[57] ABSTRACT

A device for safely collecting and transporting solvents in a manner that can be wheeled rather than carried, including a main tank for storing the solvent, and a neck member for transferring the solvent from the storage tank to the main tank. The device has a grounding strap for safety and a sight glass for viewing the solvent.

12 Claims, 4 Drawing Sheets

SOLVENT TRANSPORT DEVICE

BACKGROUND

1. Field of the Invention

The present invention relates to devices for carrying liquid solvents such as photoresist, thinner and the like.

2. Background of the Invention

In the semiconductor field, various solvents are used in the production of wafers. The Tel Mark V TM, manufactured by Tokyo Electronics Ltd., which is one of many coating and developing systems, uses some of these solvents. The tracks automatically pump the solvent waste to a holding tank. These solvents then have to be collected and transported to specified collection site. Some of these solvents may be hazardous and/or combustible.

A five gallon Polytetrafluoroethylene (PTFE) tank is provided with each system for manually draining the system holding tank. When these tanks are full, however, the lifting, transporting and dumping of them creates a serious safety hazard.

The present invention addresses the problem with a solvent transport device of unique design. It has a neck that can be positioned under the drain port of the holding tank and over the edge of the spill containment drawer, to prevent accidental spillage. It is on wheels for easy handling of more solvent. It has a sight glass to check the level of the liquid in the cart and it has a grounding strap for safety.

Thus it is an object of the present invention to provide a solvent transport device for safe, easy handling of solvents.

SUMMARY OF THE INVENTION

This and other objects are attained according to the invention by providing a solvent transport device which includes a main body which can hold more solvent than an individual transport tank, a neck member which allows for contained transfer of solvent from the storage tank to the cart, a grounding strap to prevent sparks which could ignite the solvent, a sight glass for checking the level of the liquid in the cart, two PTFE caps for closing the input port and discharge port, mating rings for the PTFE caps to screw into, a solvent resistant seal gasket to prevent leakage, wheels which allow for easy movement of the device without lifting, and doublers to shift the weight to all of the wheels for easy handling of the cart.

In the preferred, but not exclusive, embodiment chosen, the cart is constructed with 14 gauge stainless steel with a satin finish on the body. About six inches of the neck is mirror polished to prevent staining, pneumatic tires are used for easy movement of the cart. The cart of the preferred embodiment carries 25 gallons of solvent.

Transport of the solvent is effected by positioning the neck under the drain port of the holding tank and over the edge of the spill containment drawer, emptying the holding tank, moving on to the next system's holding tank and repeating the process until the main tank is full. Once the main tank is full it is easily and safely wheeled to the specified collection site where the solvent is removed from the main tank by pumping it out through the discharge port. This removal is accomplished through the use of a pneumatic pump to pump the solvent from the cart to the 55 gallon drum. Thus the need for heavy lifting is alleviated.

The features of the invention believed to be novel are set forth with particularity in the appended claims. The invention itself, however, both as to construction and method of operation, together with further objects and advantages thereof, may be best understood by reference to the following description taken in conjunction with the accompanying drawings.

BRIEF DESCRIPTION OF THE DRAWINGS

The invention may be better understood from the following detailed description, taken in conjunction with the accompanying drawings, in which.

DETAILED DESCRIPTION OF THE INVENTION

Figure 1:
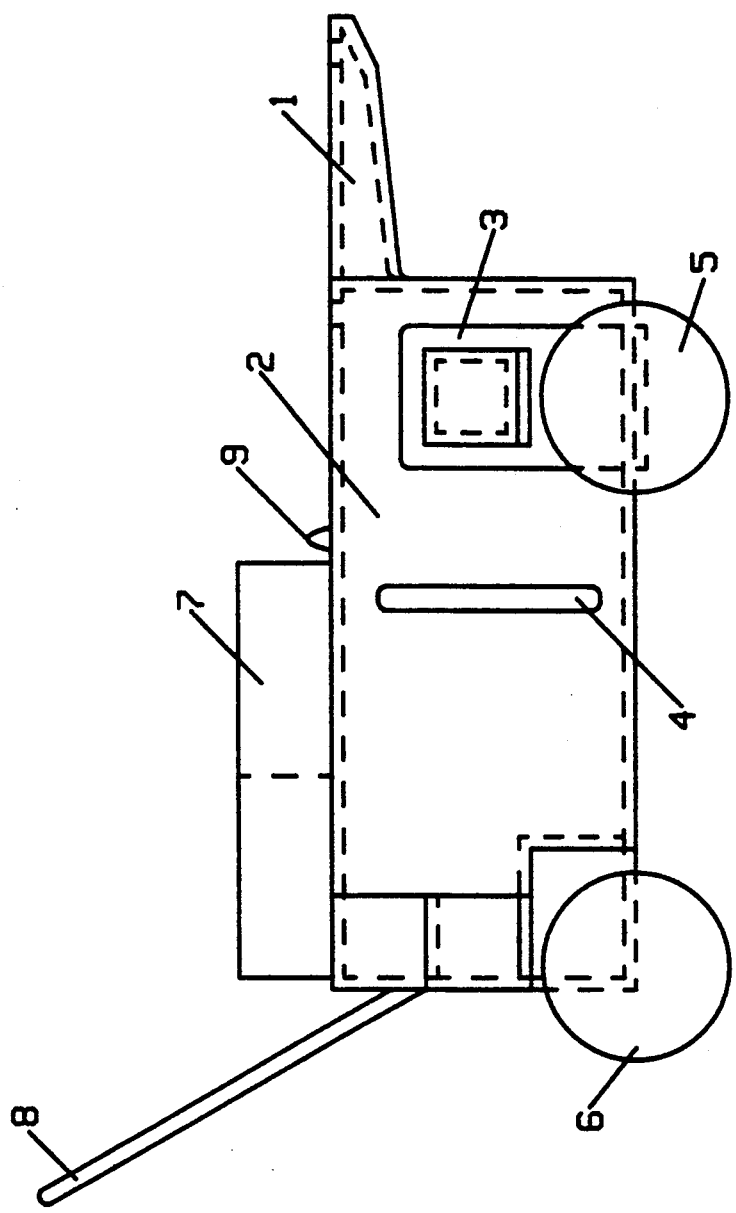
FIG. 1 is a side view of a solvent transport device constructed according to the invention.

While this invention is susceptible of embodiment in many different forms, there is shown in the drawings and will herein be described in detail one specific embodiment, with the understanding that the present disclosure is to be considered as an example of the principles of the invention and not intended to limit the invention to the embodiment illustrated.

Figure 2:
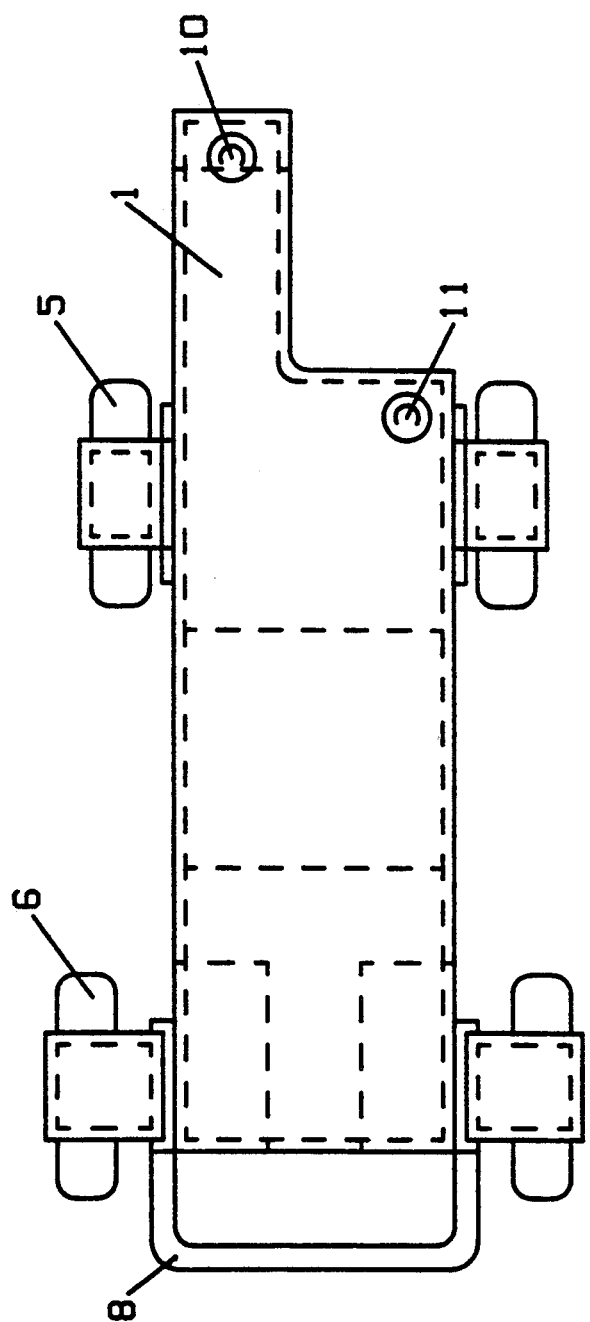
FIG. 2 is a top view of the solvent transport device shown in FIG. 1.

In the embodiment shown in FIGS. 1 and 2, the solvent transport device includes a main tank 2 having a neck member 1, with an intake port 10, angled so the solvent will run easily into the main tank 2. The neck member 1 is angled at 45 degrees directly below the intake port 10 so the solvent splashes into the tank rather than up in the air. The main tank 2 is constructed from 14 gauge stainless steel with a satin finish on the exterior and has a capacity of 25 gallons. The entire device is 47 inches long by 24 inches wide by 35 inches high if you include the handle 8. Without the handle 8 the cart is 27 inches tall.

The main tank 2 has a discharge port 11 for removing the solvent The discharge port 11 has a 2.75 inch diameter. The solvent is removed from the main tank 2 through the discharge port 11 with a pneumatic pump. The main tank 2 also has a sight glass 4 for viewing the level of the solvent.

Attached to the main tank 2 is a ground clamp 15 with terminal end fastened on top 9 in front of storage bins 7. The ground clamp, is attached to a convenient ground point of the coat and develop system to prevent sparks which could ignite combustible solvents. The storage bins 7 are each 12 inches wide by 12 inches long by 6 inches deep. In the chosen embodiment, there are two storage bins and they sit one in front of the other. The storage bins 7 are also constructed from 14 gauge stainless steel with a satin finish and can be used to store cleaning materials, safety materials or a variety of other useful items.

The main tank is transported by wheels 5 and 6. The front wheels 5 are rigid while the rear wheels 6 swivel on a conventional swivel caster support for easy steering. The wheels 5 are attached to doublers 3 for weight transfer. The doublers make the wheel base stronger by distributing the weight of the cart over a larger surface area and they make the cart more durable by thickening the outer walls of the main tank 2. For both sets of wheels 5 and 6 pneumatic tires were used.

Attached to the rear of the main tank 2 is the ergonomic handle 8 for pushing the device. It is designed to be easy to grasp and at a comfortable height to push. In the chosen embodiment, the handle was constructed from one inch diameter stainless steel tubing, is 14 inches wide and at the top is 35 inches off the ground.

Figure 3:
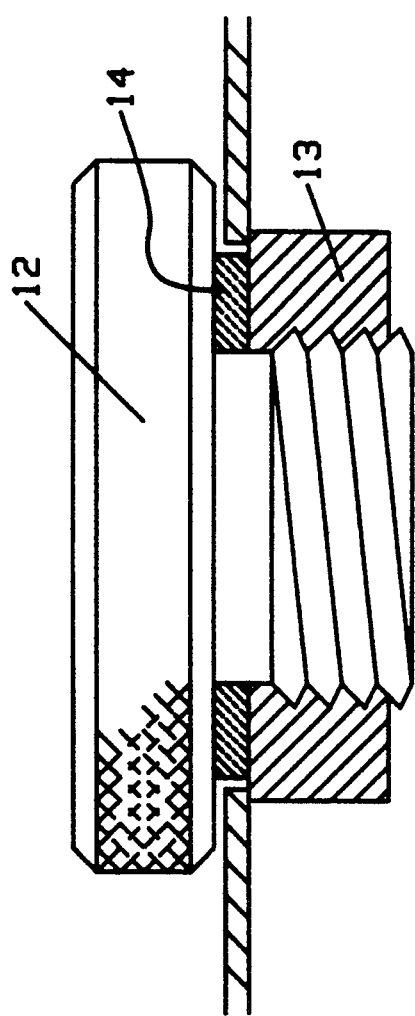
FIG. 3 is an actual size view of one of the caps for the intake or discharge ports of the solvent transport device of FIG. 1.
Figure 4:
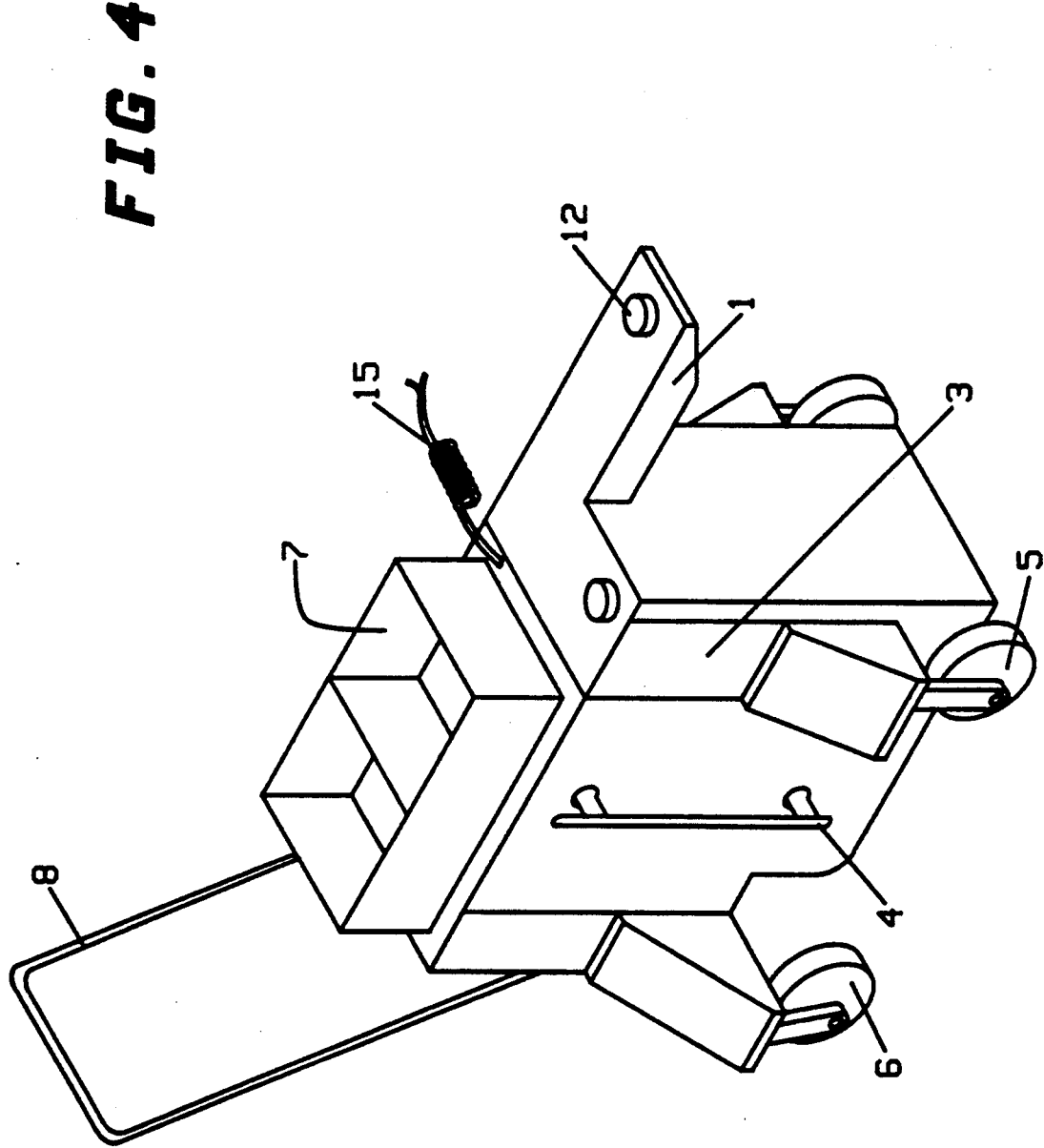
FIG. 4 is a perspective of the solvent transport device of FIG. 1.

FIG. 3 shows the caps 12 which seal the input port 10 and the discharge port 11. The caps 12 comprise two knurled screw caps 12 constructed from mechanical grade PTFE; two mating rings 13 attached to the inside of the main tank 2 and the inside of the neck member 1; and two solvent resistant seal gaskets 14 to insure a tight seal. The caps 12 screw into the mating rings 13 and seal gaskets 14.

Those skilled in the art will see that many variations are possible. For example, the tank can be designed to hold more solvent, the neck can be made longer or shorter as necessary, the neck can be made at different angles rather than directly in front of the cart, the neck could be made to pivot, there could be more than one tank for incompatible solvents, or a variety of other modifications.

Although the invention has been described and illustrated herein by reference to a specific embodiment thereof, it will be understood that such embodiment is susceptible to variation and modification without departing from the inventive concepts disclosed. All such variations and modifications, thereof, are intended to be included within the spirit and scope of the appended claims.

What is claimed is:

1. A solvent carting device, comprising:
a main tank for holding solvent;
a neck member attached to and protruding from said main tank;
a discharge port in said main tank;
said neck member comprising an intake port and a cap for said intake port;
a sight glass connected to said main tank; and swivel wheels attached to said main tank.

2. A carting device as in claim 1, further comprising a cap for said discharge port.

3. A carting device as in claim 1, further comprising a grounding strap connected to said main tank.

4. A carting device as in claim 1, wherein said wheeling means is connected to said carting device by a wheel joint.

5. A carting device as in claim 4, further comprising doubler means connected to said wheeling means for transferring weight from said wheel joint to a larger area of said carting device.

6. A carting device as in claim 1, further comprising storage bins supported by said main tank.

7. A carting device as in claim 1 in which said neck member is angled directly below said intake port to permit the solvent to run easily downward into said main tank.

8. A carting device as in claim 1 in which a top of said neck member is a flat surface when said cap is removed.

9. A carting device as in claim 1 in which said wheeling means comprises:
a front wheel set that is rigid, and
a rear wheel set that swivels.

10. A carting device as in claim 1 in which said cap comprise:
a mechanical grade PTFE filler cap,
a mating ring welded to inside of tank and,
a solvent resistant seal gasket for achieving a tight seal between said filler cap and said mating ring.

11. A solvent carting device, comprising:
a main tank;
a neck member attached to and protruding from said main tank
a discharge port in said main tank;
a cap for said discharge port;
said neck member comprising an intake port and a cap for said intake port;
said neck member is angled so that liquids passing through said intake port will flow into said main tank;
a sight glass connected to said main tank;
swivel wheels attached to said main tank; and
a flexible electrical conductor attached to said main tank for electrically grounding said solvent carting device.

12. A solvent transportation cart for collecting and transporting solvents from a coating and developing system to a collection site, comprising:
a 25 gallon tank for holding said solvent,
a rear set of wheels that swivel connected to said tank by a wheel joint at a wheel base,
a front set of wheels that are rigidly connected to said tank by a wheel joint at a wheel base,
an angled neck member angled at approximately 45 degrees with a flat top surface connected to said main tank,
a handle connected to said tank for navigating said cart,
doubler means connected to each said wheel base for transferring weight from the wheel joint to a larger surface area on the cart,
a grounding strap connected to said tank for protecting against sparks,
a sight glass connected to said tank for viewing a level of said solvent,
storage bins supported by said tank,
an intake port in said neck members,
a discharge port in said tank,
a PTFE cap for said intake port,
a PTFE cap for said discharge port,
a mating ring for said intake cap welded to an inside of said intake port,
a mating ring for said discharge cap welded to an inside of said discharge port,
a solvent resistant seal gasket for sealing said intake port, and
a solvent resistant seal gasket for sealing said discharge port.

* * * * *